United States Patent [19]
Prodaniuk

[11] Patent Number: 5,400,918
[45] Date of Patent: Mar. 28, 1995

[54] ENCLOSURE MADE UP OF IDENTICAL PIECES

[76] Inventor: Roland G. Prodaniuk, 12634 Fort Trail, Roland Centre, Edmonton, Alberta T5C 3C1, Canada

[21] Appl. No.: 917,350

[22] Filed: Jul. 23, 1992

[51] Int. Cl.$^6$ ............................................. B31D 5/00
[52] U.S. Cl. ................................. 220/677; 220/4.26; 229/116; 446/115
[58] Field of Search ....... 220/677, 690, 565, DIG. 13, 220/4.01, 4.26, 62; 446/119, 115, 125, 112; 229/116

[56] References Cited

U.S. PATENT DOCUMENTS

| | | | |
|---|---|---|---|
| 2,057,942 | 10/1936 | Fay | 220/7 X |
| 2,454,307 | 11/1948 | Cooley | 446/115 X |
| 2,918,992 | 12/1959 | Gelsavage | 446/115 X |
| 3,666,607 | 5/1972 | Weissman | 229/116 X |

*Primary Examiner*—Steven M. Pollard
*Attorney, Agent, or Firm*—Paul H. Gallagher

[57] ABSTRACT

A spherical enclosure constituting a composter made up of identical triangular pieces which are all detachably interconnected. Any of the pieces can be partially detached so that it can be swung to open position for insertion of materials into it, and removal therefrom. The pieces constitute the entire structure, the device not having any other structural pieces, either interior or exterior.

3 Claims, 1 Drawing Sheet

U.S. Patent    Mar. 28, 1995    5,400,918
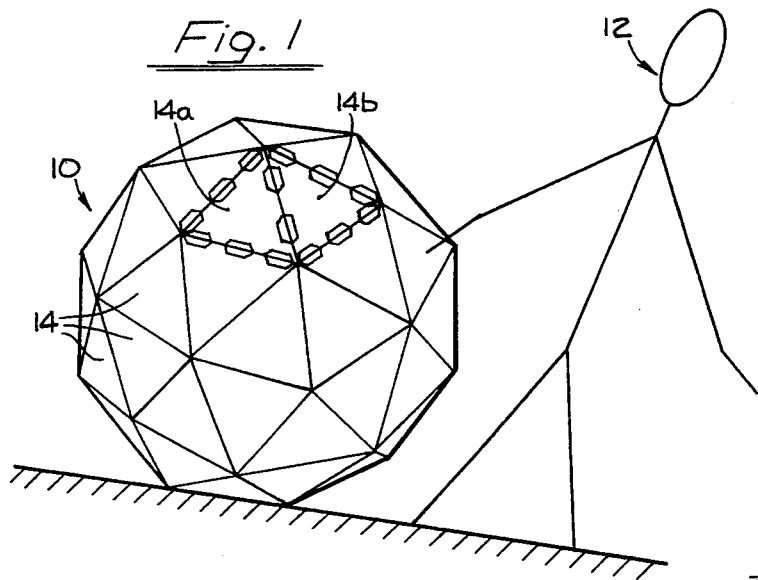
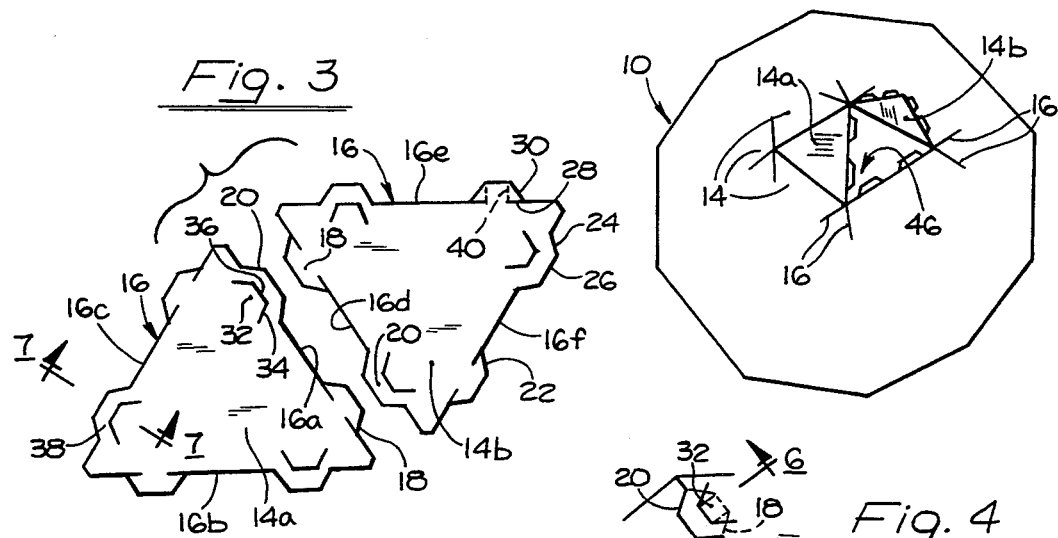
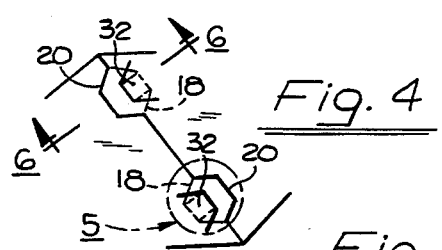
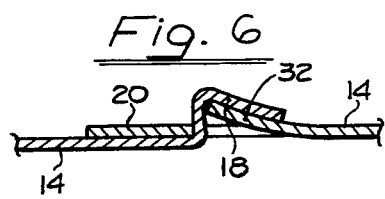
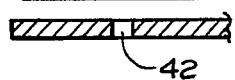
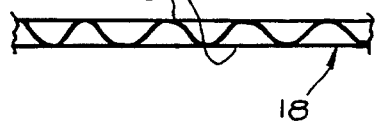
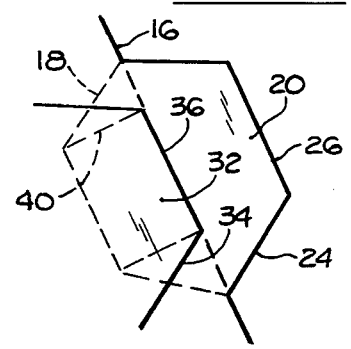

ENCLOSURE MADE UP OF IDENTICAL PIECES

SUMMARY OF THE INVENTION

The invention relates to an enclosure made up of identical pieces or panels which form the enclosing element, that is without other interior or exterior structural pieces.

The device of the invention is most useful as a composter, and the example of the embodiment herein is such a composter. However the scope of the invention is such that it covers broadly other devices that may provide an enclosure, or cover. For example, it may be utilized as a shelter. Another example is that it maybe utilized as an enclosure for instruments, to isolate the instruments from outside interference, that may affect transmission or reception.

In the use of the device as a composter, it is in the form of essentially a sphere, but it in the case of shelters for example it may be in the form of a hemisphere, or partial sphere.

In the use of the device as a composter, in spherical shape, it can be rolled, for tumbling or mixing the contents.

Another object is to provide, in the case of a sphere as in a composter, such a sphere made up entirely of identical panels, that are detachably connected together, and which can be disconnected at any desired location for forming an opening for putting composting materials therein, and removing the ultimate compost.

Another object is to provide such a composter that accommodates and promotes aerobic action in the composting.

Still another object is to provide a composter of the foregoing character, that enables excess moisture to drain from the interior, such as may be produced by the composting action, or from rain, etc., as well as enabling completely compacted particles to fall out of it.

BRIEF DESCRIPTION OF THE FIGURES OF THE DRAWINGS

FIG. 1 is a view of a spherical composter made according to the present invention.

FIG. 2 is similar to FIG. 1, with less detail, and with certain of the panels in open position.

FIG. 3 is a face view of two panels in position to be connected together.

FIG. 4 is a view of the panels of FIG. 3 after the step of fitting them together and connecting them.

FIG. 5 is a large scale view of the area enclosed in the circle 5 of FIG. 4.

FIG. 6 is a sectional view taken at line 6—6 of FIG. 4.

FIG. 7 is a sectional view taken at line 7—7 of FIG. 3.

FIG. 8 is a view similar to FIG. 7, showing an alternate form.

FIG. 9 is a sectional view of the material from which the panels are made.

DETAILED DESCRIPTION

Referring in detail to the drawings, attention is directed to FIG. 1 showing a spherical composter 10 made according to the present invention. The composter may be made of any size within a great range, a practical size being indicated by comparison with the illustration 12 of an adult person 12.

The sphere forming the composter 10 is made up of a plurality of identical pieces or panels 14 in the form of triangles. There maybe equilateral, or of other shapes such as isosceles triangles. A consideration given in selecting the shape is providing the greatest volume for a given surface area.

The material of which the pieces 14 are made maybe polypropylene, or polyethylene or other materials, various materials having various advantages, as to ease of cutting and forming, temperatures accommodated, manipulating elements of the material in manufacturing and using, etc. The panels are made of such material as to provide great strength, but without metal that would interfere with instruments, as referred to hereinbelow. Each of the pieces is preferably of a form having outer covering elements 16 (FIG. 9) and a corrugated member 18 therebetween. This form of device is known, and the different materials may be selected and used for correspondingly different purposes.

Each piece or panel 14 is basically flat, and planar, although they have limited flexibility and may be flexed to a degree in the use of the composter, but normally reverting to their flat shape. Reference to this feature is made again hereinbelow.

Two of the panels 14 are shown in FIG. 3, individually identified 14a, 14b for convenience, each panel having side edges 16 forming base lines of the triangle. In the case of the panel 14a, the side edges are individually identified 16a, 16b, 16c, and in the case of the panel 14b the side edges are individually identified 16d, 16e, 16f.

On each of the side edges 16, on each of the panels, are two tabs 18, 20, the tabs 18 being male tabs and the tabs 20 being female tabs. There may be two tabs on each side as in FIG. 3, or more as in FIG. 1.

All of the tabs, 18, 20, have inclined side edges 22, 24, respectively, and an outer edge 26 that is straight and parallel with the side edges 16. The tabs 18, 20 are the same size. In the case of the tabs 18, they have side cuts 28 extending inwardly in line with the side edges 16, forming laterally outer points 30 on the tabs to be referred to again hereinbelow.

In the case of the tabs 20, the tabs themselves extend outwardly beyond the base line 16, and each one includes a sub tab 32 shaped similarly to the tabs 20 which are cut from the body of the panel. The sub tab 32 as thus cut, has inclined side edges 34 and an end edge 36 in line with the base line 16. In the tabs 30, with the sub tabs 32 thus cut, there are solid pieces or elements 38 continuing from the body of the panel out into the main part of the tab 20.

As noted above, the panels are identical, and thus the tabs 18, 20, while individually different, are arranged relative to each other on each edge of the triangular panel, that considering the panels all in all, the tabs 18, 20 and their positioning on the side edges of the panels, are identical, and when the panels are positioned for interfitting or interconnecting, as in FIG. 3, a male tab 18 is positioned opposite a female tab 20.

To continue the step of connecting the panels, the tabs 18 (FIG. 3) are placed for example under the tabs 20 and inserted into the cuts surrounding the corresponding sub tabs 32. This position is shown in FIG. 4, and in more detail in FIG. 6.

In so inserting the tabs 20, the side points 30 are folded or bent up, or under, either, to fit into the cut or hole 36 at the sub tab 32 to enable the tab 20 to go therethrough. When released, the side points 30 flatten out, and engage the uncut solid elements 38, and produce a positive interlock. If desired, the tabs 28 may be weakened or scored as indicated by the lines 40 to facilitate folding the points to insert them into the holes. This interlocking step is performed in the case of each of the opposed pairs of tabs 18, 20, at each juncture of adjoining panels (FIG. 3), in which the side edges 16a, 16b are fitted together. A similar step is performed at each of the junctures between adjacent panels, this procedure continuing with all of the individual panels until they are all interconnected to form the sphere.

FIGS. 7 and 8 show two different forms of cuts for forming the sub tabs 32. As indicated above, these sub tabs are integral with the body of the panel, and three cuts are made to form the three edges of the sub tab. These cuts may be made relatively wide, as indicated at 42 in FIG. 7, with spaces between opposed edges, to enable the sub tabs to be flexed easily, but also to facilitate insertion of the tabs 28 through the holes. While providing such widths of these cuts facilitates insertion of the tabs 28, the tabs 28 are not held so securely. However cuts as indicated at 44 may be made, which are as if cut by a knife, without space between the opposed edges. In the latter case the tabs 28 can nevertheless be inserted through the cuts, but it is more difficult than in the case of the cuts 42, but in the case of the cuts 44 the tabs are held more securely.

The entire panel, including the cuts forming the main side edges 16, as well as the sub tabs 32, and the side cuts 28, may be made by a laser instrument, or they may be produced by a die. Cutting them by a laser instrument is quite efficient, but if they are made by a die, the score lines 40 may be produced in the same operation of cutting, for facilitating flexing of the points 30.

When all of the panels are put together and interconnected, as represented in FIG. 1, the sphere is complete and self-sustained. The panels 14, as noted above, while possessing a limited degree of flexibility, are basically and normally flat and while they may flex or bend somewhat, they nevertheless assume a condition that is nearly flat, and the panels altogether maintain a shape closely approximating a spherical, and thus producing an effectively spherical composter 10. The enclosing member made up of the panels forms a wall skin, and this is the complete structure of the device. It is self sustained and holds upright without other structural members, resting on a supporting surface.

The panels are so dimensioned and proportioned that a total of sixty of them make up a complete spherical composter.

As used herein, spherical includes substantially spherical, to cover the composter as shown in FIG. 1 where points and liners occur between adjacent panels, although these are of small dimension. Also, spherical includes hemispherical and partially spherical. Additionally, isosceles includes equilateral, because the former includes triangles having two equal sides.

The panels connected as described above, are correspondingly disconnectable, also. Since all of the panels are identical, and connected together in identical manner, any of the panels can be disconnected at any location. This fact is of great significance in the practical use of the composter. Assuming a given position of the composter, as represented in FIG. 1, two of the panels at or near the top of the sphere, such as panels 14a, 14b, can be disconnected, each along two of its own edges. These panels are then openable from their connected position, to an upper position as shown in FIG. 2. Only one panel may be opened, if desired, but two 10 provide a much greater opening. In the case of opening two panels, the second one may be disconnected, or freed, in addition to the one, by only disconnecting the second one on one side. The opening thus produced, indicated at 46 is relatively large, and composting materials may be easily inserted therethrough into the composter. Those panels are then again connected together, and the composter rolled, in any direction, for tumbling the contents, which produces an effect similar to stirring. The fresh materials just previously inserted are then repositioned down along the side, or possibly the bottom, and other materials that have been subjected to composting action, are brought upwardly, toward or to the top. As is well known the composting materials must be stirred periodically, at periods of no longer than three days, and preferably more often than that. In the present case, the rolling of the composter, and consequent tumbling and stirring of the contents may be done in an instant of time following the insertion of the new materials. This rolling action requires very little effort. The effort required may be contrasted greatly with shoveling and stirring. To roll the sphere requires a very small effort, and there is no part of that action that requires great effort such as can be compared with shoveling, as in lifting the materials by a shovel and then dumping or dropping them, and continuing the lifting action.

The flexibility of the panels is an advantage in the rolling action. An apex of a pentagon (or a hexagon) at the bottom may be depressed (upwardly) when on the ground, and all of the panels in that polygon are flattened and all rest on the ground, greatly stabilizing the sphere against accidently rolling.

There are of course small openings or cracks between adjacent panels through which the air can pass. This produces a great aerating action, and develops aerobic action in the composting process. In the compacting action, as the portion or particles become composted, or nearly so, they will fall through the cracks and fertilize the ground. This is of great importance in the case of lawns where bare spots sometims occur.

These same openings or cracks, also enable water to drain from the interior, such as that produced in the composting action, and any that entered thereinto due to rain.

A great advantage of the invention is that because it is so easily rolled for tumbling the materials, that as a general procedure it would be rolled often because of the ease in doing so, with the consequence that the aerobic action continues, eliminating or minimizing annoying odors.

A further advantage is that since the composter is so easily rolled, and that it would be rolled very often, it does not remain in one location for any length of time, thus eliminating corresponding deterioration of lawn due to lack of sunlight, as in the case of other types of composters which as a general rule are not moved at all.

Another and great feature of the invention is that the device is made up entirely of the panels 14. There 20 are no other structural members, either interior or exterior, such as metal framework, etc. Accordingly the device, or enclosure, is constituted entirely by the material of which the panels are made, e.g., polypropylene, polyethylene, and such materials may be selected according to functions to be performed. Since the entire device, or enclosure, is made of one single material, that material can be selected according to such phenomena as magnetic rays, electrical rays, whereby instruments may be used in the enclosure without being affected by such outside influences.

It is also within the scope of the invention that the device need not be completely spherical, but may be hemispherical or partially spherical as may be used in the case of a shelter or other stationary structures.

I claim:

1. An enclosure comprising, continuous wall skin of spherical shape, the wall skin being made up of a plurality of identical panels, all the side edges of each panel being identical, and each side edge including a base line, each panel having tabs on each side edge extending outwardly therefrom, the tabs having outer edges lying in a common line parallel with the base line, and having side edges diverging toward the base line, the tabs including a male tab and a female tab on each edge, the male tabs having slits in their side edges extending toward each other in line with the base line, the panel including at each female tab a sub tab cut from the body of the panel, shaped similar to the female tab, having an outer edge in line with the base line, and being connected to the body of the panel at the position inwardly opposite the outer edge, the sub tab being flexible to form a hole, the panels being detachably connected together by insertion of the male tab in the hole corresponding to the respective female tab, the panels constituting the entire structure of the wall skin and self sustaining it in spherical shape, and, the interconnected tabs constituting sole means for securing the panel together.

2. An enclosure according to claim 1 wherein, all of the tabs are of the same size.

3. An envelope according to claim 2, wherein, space between the slits in the side edges of each male tab is of a length similar to the length of the outer edge of said sub tab, and the male tab has score lines parallel with each other and perpendicular to the side edge, and extending from the outer edge of the tab to said slits, constituting weakening lines and thereby forming flexible points at the side portions of the male tab.

* * * * *